United States Patent
Haupt

(10) Patent No.: US 7,349,764 B2
(45) Date of Patent: Mar. 25, 2008

(54) WATERING WARNING DEVICE

(76) Inventor: Rolf Wilhelm Haupt, A3, 12fl, Kailey Industrial Centre, No. 12 Fung Yip Street, Chaiwan (HK)

( * ) Notice: Subject to any disclaimer, the term of this patent is extended or adjusted under 35 U.S.C. 154(b) by 137 days.

(21) Appl. No.: 11/253,792

(22) Filed: Oct. 20, 2005

(65) Prior Publication Data

US 2006/0096174 A1    May 11, 2006

(30) Foreign Application Priority Data

Oct. 22, 2004    (DE)    ............... 10 2004 051 438

(51) Int. Cl.
*G05D 7/00*    (2006.01)
*G05D 11/00*    (2006.01)

(52) U.S. Cl. ............... 700/284; 137/78.2; 47/79
(58) Field of Classification Search ................ 700/284; 137/78.2, 78.3; 234/63, 64, 69, 70, 99; 47/79
See application file for complete search history.

(56) References Cited

U.S. PATENT DOCUMENTS 3,740,575 A * 6/1973 Bizzoco ................ 307/141.4
5,337,957 A * 8/1994 Olson .................... 239/63
6,374,079 B1 * 4/2002 Hsu ...................... 455/11.1
6,453,216 B1 * 9/2002 McCabe et al. ............ 700/284
2003/0208306 A1 * 11/2003 Addink et al. ............. 700/284

\* cited by examiner

*Primary Examiner*—Leo Picard
*Assistant Examiner*—Sheela Rao
(74) *Attorney, Agent, or Firm*—Whitham Curtis Christofferson & Cook, PC

(57) ABSTRACT

A watering warning device (1) for determining watering intervals for at least one plant to be monitored, having at least one moisture content sensor (2), a timer (6) and an evaluation unit (3) is described. The evaluation unit (3) is designed for determining the time ($t_G$) of the next necessary watering operation for the at least one monitored plant in dependence on a characteristic watering curve (S) over time (t), the watering curve (S) being determinable in a self-learning manner in at least one learning phase from a low moisture value ($FG_N$), measured at a watering time, the high moisture value ($FG_H$), measured after completion of the watering operation following the watering time, and the time ($t_N$) until the low moisture value ($FG_N$) is reached, determined with the timer (6) or extrapolated.

18 Claims, 2 Drawing Sheets

WATERING WARNING DEVICE

DESCRIPTION BACKGROUND OF THE INVENTION

1. Field of Invention

The invention relates to a watering warning device for determining watering intervals for at least one monitored plant, having at least one moisture content sensor, a timer and an evaluation unit.

2. Background Description

The water requirement of houseplants in particular must be constantly monitored to avoid the plants dying off. It is detrimental in this respect in particular if the moisture content of the soil is too low or too high.

It is known to automate the watering operation with an irrigation system operating on the pipette principle, in which water from a water reservoir is sucked through a capillary tube into a clay vessel inserted into the soil of the plant. The clay vessel, which is for the most part conical, provides a distribution of the water in small amounts over a long period of time. The amount that is sucked up is in this case determined by the plant itself.

SUMMARY OF THE INVENTION

The object of the invention is to provide a watering warning device for determining watering intervals with which the necessity for a watering operation in dependence on the respectively monitored plant can be predicted easily and as accurately as possible.

The object is achieved according to the invention with the watering warning device of the generic type by the evaluation unit being designed for determining the time for the next necessary watering operation for the at least one monitored plant in dependence on a characteristic watering curve over time. The watering curve is in this case determinable in a self-learning manner in at least one learning phase from a low moisture value, measured with the moisture content sensor at a watering time, the high moisture value, measured after completion of the watering operation following the watering time, and the time until the low moisture value is reached, determined with the timer or extrapolated.

The watering curve may be described for example by the slope of the watering curve as a watering curve parameter. The slope of the watering curve is in this case determined from the time established in the learning phase for the soil moisture content to fall from the high moisture value to the low moisture value. The low moisture value and the high moisture value are in this case empirically established by the behavior of the user during the learning phase.

The characteristic watering curve for the corresponding watering curve parameter, for example the slope, can be adapted in recurring learning phases.

The self learning of the watering cycle means that a user does not have to set a moisture content. Rather, the plant to be monitored merely has to be pre-watered at least once in an appropriate way. The watering warning device then automatically senses the water consumption of the plant over time and can even adapt to changes which result from growth of the plant.

Furthermore, a temperature sensor is preferably coupled to the evaluation unit for sensing the ambient temperature. The evaluation unit then determines the time for the next necessary watering operation also in dependence on the measured ambient temperature as a correction factor.

In a corresponding way, the evaluation unit may be connected to an atmospheric moisture sensor to take into account the measured atmospheric humidity as a correction factor.

Further correction factors may be the time of year, the growth of the plant, etc.

A radio transmitter is preferably connected to the evaluation unit for communication with a corresponding radio receiver of an independent, spatially separate indicating unit. The indicating unit has a display for indicating the elapse of a watering interval as the time when the next watering operation is necessary. At least one code number for the respective radio transmitter and the time for the next watering operation are transmitted from the evaluation unit to the indicating unit as and when required or at fixed time intervals.

In another embodiment, at least one moisture content sensor and the evaluation unit may be units that are independent of each other and spatially separate, which likewise communicate with each other by means of a radio transmitter and radio receiver. As a relatively small unit, the moisture content sensor can consequently be inserted decentrally into plant pots and be battery-operated. Since the evaluation takes place centrally, energy and space are saved as a result. The respectively measured moisture content is transmitted with a code number for the respective moisture content sensor from the moisture content sensor to the evaluation unit on request, as and when required or at intervals.

Furthermore, it is advantageous if an optical and/or acoustic alarm signaling device is connected to the evaluation unit for triggering an alarm after the elapse of a watering interval.

The evaluation unit is preferably connected to a display to indicate the time of the next necessary watering operation. This may take place absolutely by output of the date, day of the week and/or the time of day of the next necessary watering operation. In addition or alternatively, a relative indication of the number of remaining days or hours until the next necessary watering operation may be provided. The indication may also take place in the manner of a filling level indicator, by a bar chart or by a percentage value.

BRIEF DESCRIPTION OF THE DRAWINGS

The invention is explained in more detail below by way of example on the basis of the accompanying drawings, in which.

DETAILED DESCRIPTION OF A PREFERRED EMBODIMENT OF THE INVENTION

Figure 1:
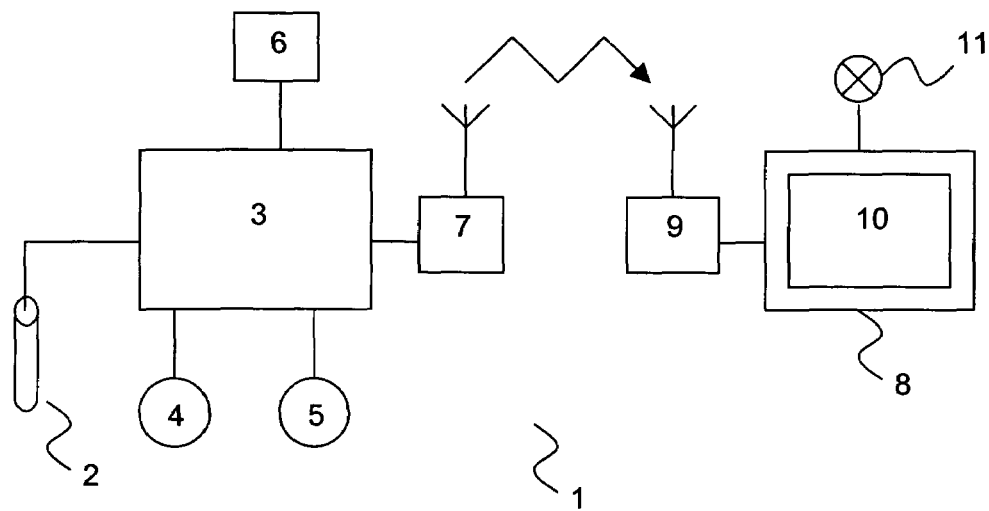
FIG. 1 shows a block diagram of a watering warning device according to the invention.

FIG. 1 illustrates a block diagram of a watering warning device 1 according to the invention, having a moisture content sensor 2, which is connected to an evaluation unit 3. Furthermore, the ambient temperature is measured by a temperature sensor 4 and the atmospheric humidity of the ambience is measured by an atmospheric moisture sensor 5 and these are transmitted to the evaluation unit 3.

The evaluation unit 3 is coupled to an optionally integrated timer 6, which is preferably a clock with a date function.

The evaluation unit 3 is connected to a radio transmitter 7 for communication with a separate indicating unit 8 via a radio receiver 9 of the indicating unit 8, in order to transmit the time for the next watering operation and a code number for the respective radio transmitter 7 or the moisture content sensor 2 to the indicating unit 8.

The temperature sensor 4 and/or the atmospheric moisture sensor 5 may also be implemented directly with the indicating unit 8, so that no radio data transmission of the temperature sensor data or atmospheric moisture sensor data is necessary.

The indicating unit 8 has a display 10 for indicating the time when the next watering operation is necessary. This may take place for example as date information and/or time-of-day information. At the same time, however, a bar indication may also indicate the water level, for example as values given as a percentage.

The indicating unit 8 also has an alarm signaling device 11, for example in the form of a light-emitting diode LED and/or an acoustic alarm signaling device, to output a warning when the watering time has passed.

By incorporating a radio clock or by manual input, it is possible to specify a day of the week as the time for the next watering, and optionally to suppress the alarm output at nighttime.

Figure 2:
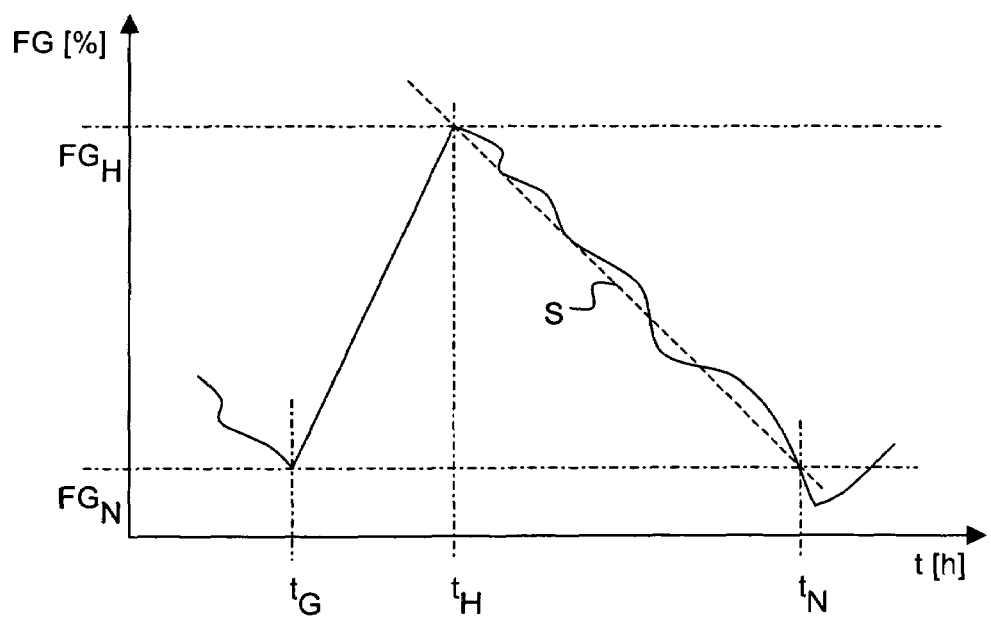
FIG. 2 shows a characteristic watering curve by way of example, as the soil moisture content plotted over time, with the slope as the watering curve parameter.

The determination of the time of the next necessary watering operation for the purpose of prediction and alarm signaling takes place with the aid of a characteristic watering curve. As represented in FIG. 2, this is determined in a learning cycle, in which the user waters the at least one monitored plant. With the moisture content sensor 2, the low moisture value $FG_N$ is determined at the beginning of the learning watering operation as the minimum value of the soil moisture content FG recorded over the time t and the high moisture value $FG_H$ is determined after completion of the watering operation. The low moisture value $FG_N$ and the high moisture value $FG_H$ are stored. Subsequently, the moisture content FG of the plant soil is measured over the time t and the time $t_N$ at which the low moisture content $FG_N$ is reached again is determined. The slope of a falling straight line is calculated as a characteristic watering curve from the difference between the time $t_H$ to the end of the learning watering operation and the time $t_N$ until the low moisture value $FG_N$ is reached again and from the difference between the high moisture value $FG_H$ and the low moisture value $FG_N$. This becomes:

$$S = \sqrt{(t_N - t_H)^2 + (FG_H - FG_N)^2}.$$

It is then easy to calculate for each point in time t from the currently measured soil moisture value $F_G(t)$ and the slope S at which time $t_G$ the low moisture value $FG_N$ is reached, and consequently the next watering operation becomes necessary.

The time $t_G$ of the next necessary watering operation is in this case calculated as follows:

$$t_G = \sqrt{S^2 - (FG(t) - FG_N)^2} + t,$$

where S is the slope of the characteristic watering curve as the watering parameter, FG(t) is the soil moisture content measured at the current point in time t of the monitored plant, $FG_N$ is the low moisture value and t is the current time.

The time $t_N$ when the low moisture value $FG_N$ is reached again can also be extrapolated, for example after a 30% change in moisture or after a number of hours. In this way it is already possible in the first learning cycle to make a prediction, which can be updated on the basis of the further progression of the current watering curve at any time or at intervals. The learning watering operation consequently already has an effect on the current learning cycle and not only on the following watering cycle.

Also in the case of future watering cycles, the last learning cycle is taken as a basis for the prediction. Since, however, learning is continuously proceeding, the prediction can always be corrected in real time.

The moisture content sensor 2 may have an optical indication, to provide the user with signals. This may be information concerning the correct/incorrect loading of batteries, the state of batteries, the contact of the moisture content sensor 2 with the plant soil, the request for watering, the detection of the watering operation, the beginning of the learning watering operation by the completion of a setup phase, the exceeding of the watering reference point, etc.

Figure 3:
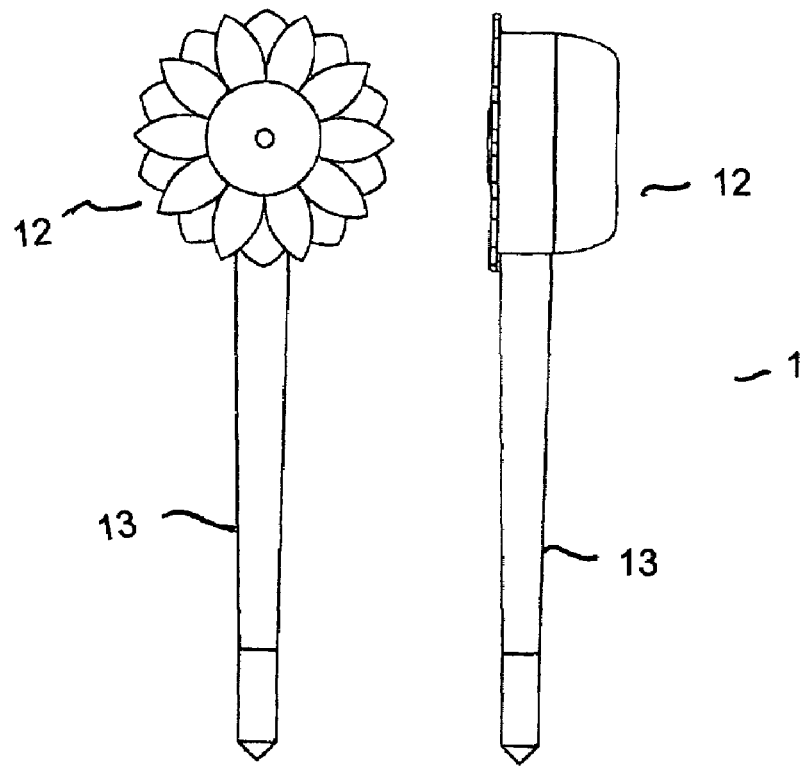
FIG. 3 shows a decentral watering warning device with a moisture content sensor, an evaluation unit and a radio transmitter.
Figure 4:
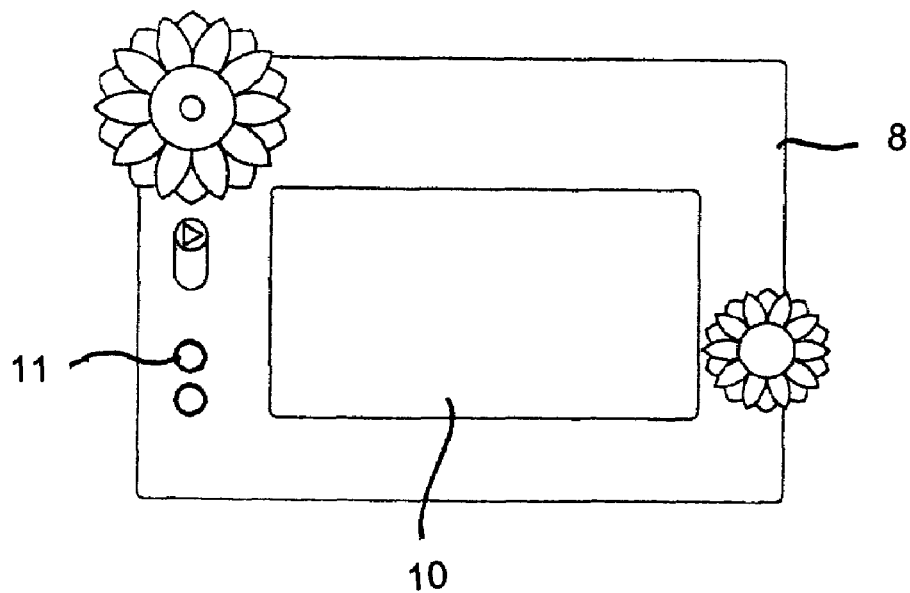
FIG. 4 shows an indicating unit with a display and a radio receiver.

FIGS. 3 and 4 illustrate an embodiment of the watering warning device 1 represented in a two-part form in FIG. 1 as a block diagram.

The part of the watering warning device 1 with the moisture content sensor 2, the evaluation unit 3 and the radio transmitter 7 is in this case integrated in a battery- or solar-operated manner in a housing 12 with a rod-shaped extension 13, which is inserted into the plant soil of the at least one plant to be monitored. FIG. 3, on the other hand, shows the indicating unit 8 in a view from the front, with the display 10 and a light-emitting diode as the optical alarm signaling device 11.

I claim:

1. A watering warning device for determining watering intervals for at least one monitored plant, comprising
    at least one moisture content sensor;
    a timer; and
    an evaluation unit determining a time of a next necessary watering operation for at least one monitored plant in dependence on a characteristic watering curve over time, the watering curve being determinable in a self-learning manner in at least one learning phase from
        a low moisture value, measured at a watering time,
        a high moisture value, measured after completion of the watering operation following said time of a next necessary watering operation, and
        a time until a low moisture value is reached.

2. The watering warning device as claimed in claim 1, further comprising a temperature sensor coupled to the evaluation unit for sensing ambient temperature, the evaluation unit determining a time for a next necessary watering operation in dependence on measured ambient temperature as a correction factor.

3. The watering warning device as claimed in claim 1, further comprising an atmospheric moisture sensor sensing ambient atmospheric moisture coupled to the evaluation unit, said evaluation unit determining a time for a next necessary watering operation in dependence on measured atmospheric moisture as a correction factor.

4. The watering warning device as claimed in claim 1, said evaluation unit determining a time for a next necessary watering operation in dependence on time of year as a correction factor.

5. The watering warning device as claimed in claim 1, said evaluation unit determining a time for a next necessary watering operation in dependence on plant growth.

6. The watering warning device as claimed in claim 1, said evaluation unit activating a water pump for an automatic watering operation.

7. The watering warning device as claimed in claim 1, further comprising
a radio transmitter connected to the evaluation unit for communicating with a corresponding radio receiver of an independent spatially separate indicating unit with a display indicating when a next watering operation is necessary,
said evaluation unit transmitting a code number for said radio transmitter and a time for said next watering operation.

8. The watering warning device as claimed in claim 1, further comprising at least one moisture content sensor spatially separate from said evaluation unit,
said at least one moisture content sensor being connected to a radio transmitter and
said evaluation unit being connected to a radio receiver,
said radio transmitter transmitting to said radio receiver at least one of the measured moisture content and a code number for the moisture content sensor.

9. The watering warning device as claimed in claim 1, further comprising an alarm connected to the evaluation unit, said alarm being triggered after when a watering interval has elapsed.

10. The watering warning device as claimed in claim 9, wherein said alarm comprises an optical alarm signaling device.

11. The watering warning device as claimed in claim 9, wherein said alarm comprises an acoustic alarm signaling device.

12. The watering warning device as claimed in claim 1, further comprising a display and wherein said evaluation unit is connected to said display and indicates a time of a next necessary watering operation.

13. The watering warning device as claimed in claim 12, wherein said display indicates said time of a next necessary watering operation by one or a plurality of date, day of the week, and time of day for said next necessary watering operation.

14. The watering warning device as claimed in claim 12, wherein said display indicates said time of a next necessary watering operation by indicating an amount of time until said next necessary watering operation.

15. The watering warning device as claimed in claim 14, said amount of time is indicated by a number representing one or a plurality of remaining days and remaining hours until said next necessary watering operation.

16. The watering warning device as claimed in claim 14, said amount of time is indicated by one or a plurality of a bar chart and a percentage value.

17. The watering warning device as claimed in claim 1, wherein said timer determines a period of time until a low moisture value is reached.

18. The watering warning device as claimed in claim 9, wherein said evaluation unit determines a period of time until a low moisture value is reached by extrapolation from said characteristic watering curve.

* * * * *